US008554666B2

(12) United States Patent
Choudhuri et al.

(10) Patent No.: US 8,554,666 B2
(45) Date of Patent: *Oct. 8, 2013

(54) TOTAL STRUCTURAL RISK MODEL

(75) Inventors: Tirthankar Choudhuri, Gurgaon Haryana (IN); Dewan Anjali, Uttar Pradesh (IN); Amber Gupta, Guargaon Haryana (IN); Kathleen Haggerty, Staten Island, NY (US); Di Xu, Edison, NJ (US); Chao Yuan, Montclair, NJ (US)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/165,701

(22) Filed: Jun. 21, 2011

(65) Prior Publication Data

US 2011/0251948 A1   Oct. 13, 2011

Related U.S. Application Data

(63) Continuation of application No. 12/938,247, filed on Nov. 2, 2010, now Pat. No. 7,991,690, which is a continuation of application No. 12/040,757, filed on Feb. 29, 2008, now Pat. No. 7,849,004.

(51) Int. Cl.
*G06Q 40/00* (2012.01)
*G06Q 40/02* (2012.01)

(52) U.S. Cl.
CPC .................................... *G06Q 40/02* (2013.01)
USPC .................. 705/38; 705/35; 705/37; 705/40; 705/7.29; 705/7.11; 705/39

(58) Field of Classification Search
USPC .............. 705/35–38, 39, 40, 7.29, 7.11, 7.28, 705/7.37, 30, 44; 709/229
See application file for complete search history.

(56) References Cited

U.S. PATENT DOCUMENTS

| | | | | |
|---|---|---|---|---|
| 4,648,038 | A | * | 3/1987 | Roberts et al. .............. 705/36 R |
| 5,025,138 | A | | 6/1991 | Cuervo |
| 5,870,720 | A | | 2/1999 | Chusid et al. |
| 5,878,404 | A | | 3/1999 | Stout et al. |
| 6,117,323 | A | | 9/2000 | Haggerty |
| 6,999,943 | B1 | * | 2/2006 | Johnson et al. ................. 705/39 |
| 7,386,493 | B2 | | 6/2008 | Lederman |
| 7,593,890 | B1 | * | 9/2009 | Bradley et al. ................. 705/38 |
| 7,792,742 | B1 | | 9/2010 | Thomas et al. |
| 7,814,008 | B2 | | 10/2010 | Choudhuri et al. |
| 7,849,004 | B2 | | 12/2010 | Choudhuri et al. |
| 7,853,520 | B2 | | 12/2010 | Choudhuri et al. |
| 7,881,994 | B1 | * | 2/2011 | An et al. ......................... 705/35 |
| 7,925,580 | B2 | * | 4/2011 | Brasch ............................ 705/38 |

(Continued)

OTHER PUBLICATIONS

USPTO; Non-Final Office Action dated Dec. 23, 2008 for U.S. Appl. No. 12/040,767.

(Continued)

*Primary Examiner* — Tien Nguyen
(74) *Attorney, Agent, or Firm* — Snell & Wilmer L.L.P.

(57) ABSTRACT

The present invention generally relates to financial data processing, and in particular it relates to credit scoring, consumer profiling, consumer behavior analysis and modeling. More specifically, it relates to risk modeling using the inputs of credit bureau data, size of wallet data, and, optionally, internal data.

19 Claims, 6 Drawing Sheets

(56) References Cited

U.S. PATENT DOCUMENTS

| | | | |
|---|---|---|---|
| 8,204,774 B2* | 6/2012 | Chwast et al. ............... | 705/7.29 |
| 2001/0037289 A1 | 11/2001 | Mayr et al. | |
| 2002/0007341 A1* | 1/2002 | Lent et al. ...................... | 705/38 |
| 2002/0019808 A1 | 2/2002 | Sharma | |
| 2002/0049738 A1 | 4/2002 | Epstein et al. | |
| 2002/0052836 A1 | 5/2002 | Galperin et al. | |
| 2002/0095454 A1 | 7/2002 | Reed et al. | |
| 2002/0123949 A1 | 9/2002 | VanLeeuwen | |
| 2003/0009418 A1 | 1/2003 | Green et al. | |
| 2003/0018549 A1 | 1/2003 | Fei et al. | |
| 2003/0033261 A1 | 2/2003 | Knegendorf | |
| 2003/0036990 A1 | 2/2003 | Sprehe | |
| 2003/0093366 A1 | 5/2003 | Halper et al. | |
| 2003/0144950 A1 | 7/2003 | O'Brien et al. | |
| 2003/0149658 A1 | 8/2003 | Rossbach et al. | |
| 2003/0212628 A1 | 11/2003 | Kuttan et al. | |
| 2004/0059653 A1 | 3/2004 | Verkuylen et al. | |
| 2004/0107161 A1 | 6/2004 | Tanaka et al. | |
| 2004/0128232 A1 | 7/2004 | Desclous | |
| 2004/0143526 A1 | 7/2004 | Monasterio et al. | |
| 2005/0234789 A1 | 10/2005 | Czyzewski et al. | |
| 2005/0262013 A1 | 11/2005 | Guthner et al. | |
| 2006/0143071 A1* | 6/2006 | Hofmann ........................ | 705/10 |
| 2006/0224480 A1 | 10/2006 | Bent et al. | |
| 2006/0235788 A1 | 10/2006 | Guyton | |
| 2006/0242046 A1 | 10/2006 | Haggerty et al. | |
| 2006/0248003 A1 | 11/2006 | Basin et al. | |
| 2006/0271472 A1* | 11/2006 | Cagan ............................. | 705/38 |
| 2007/0027799 A1 | 2/2007 | Manelis et al. | |
| 2007/0043654 A1* | 2/2007 | Libman .......................... | 705/38 |
| 2007/0050288 A1 | 3/2007 | Sarkar et al. | |
| 2007/0061260 A1 | 3/2007 | deGroeve et al. | |
| 2007/0067207 A1 | 3/2007 | Haggerty et al. | |
| 2007/0124237 A1 | 5/2007 | Sundarajan et al. | |
| 2007/0174411 A1 | 7/2007 | Brokenshire et al. | |
| 2007/0208640 A1* | 9/2007 | Banasiak et al. .............. | 705/35 |
| 2007/0226130 A1 | 9/2007 | Haggerty et al. | |
| 2007/0244779 A1 | 10/2007 | Wolff | |
| 2008/0010188 A1 | 1/2008 | Beardsell et al. | |
| 2008/0033852 A1 | 2/2008 | Megdal et al. | |
| 2008/0086426 A1 | 4/2008 | Dilip et al. | |
| 2008/0126057 A1 | 5/2008 | Jain et al. | |
| 2008/0221990 A1 | 9/2008 | Megdal et al. | |
| 2008/0228612 A1 | 9/2008 | Schmidle | |
| 2008/0243680 A1* | 10/2008 | Megdal et al. .................. | 705/38 |
| 2008/0281734 A1 | 11/2008 | Longe et al. | |
| 2008/0294540 A1 | 11/2008 | Celka et al. | |
| 2008/0301038 A1* | 12/2008 | Anderson et al. .............. | 705/38 |
| 2009/0089198 A1 | 4/2009 | Kroutik | |
| 2009/0222373 A1 | 9/2009 | Choudhuri et al. | |
| 2009/0222374 A1 | 9/2009 | Choudhuri et al. | |
| 2009/0222375 A1 | 9/2009 | Choudhuri et al. | |
| 2009/0222376 A1 | 9/2009 | Choudhuri et al. | |
| 2009/0222377 A1 | 9/2009 | Choudhuri et al. | |
| 2009/0222378 A1 | 9/2009 | Choudhuri et al. | |
| 2009/0222379 A1 | 9/2009 | Choudhuri et al. | |
| 2009/0222380 A1 | 9/2009 | Choudhuri et al. | |
| 2011/0047071 A1 | 2/2011 | Choudhuri et al. | |
| 2011/0251948 A1 | 10/2011 | Choudhuri et al. | |

OTHER PUBLICATIONS

USPTO; Non-Final Office Action dated Feb. 12, 2009 for U.S. Appl. No. 12/040,742.
USPTO; Non-Final Office Action dated Mar. 17, 2009 for U.S. Appl. No. 12/040,802.
USPTO; Non-Final Office Action dated Mar. 20, 2009 for U.S. Appl. No. 12/040,809.
USPTO; Non-Final Office Action dated Mar. 20, 2009 for U.S. Appl. No. 12/040,781.
USPTO; Non-Final Office Action dated Mar. 20, 2009 for U.S. Appl. No. 12/040,795.
USPTO; Advisory Action dated Oct. 6, 2010 for U.S. Appl. No. 12/040,781.
USPTO; Non-Final Office Action dated May 1, 2009 for U.S. Appl. No. 12/040,786.
USPTO; Final Office Action dated Jun. 25, 2009 for U.S. Appl. No. 12/040,767.
USPTO; Final Office Action dated Sep. 17, 2009 for U.S. Appl. No. 12/040,781.
USPTO; Final Office Action dated Sep. 17, 2009 for U.S. Appl. No. 12/040,809.
USPTO; Final Office Action dated Sep. 18, 2009 for U.S. Appl. No. 12/040,795.
USPTO; Final Office Action dated Sep. 21, 2009 for U.S. Appl. No. 12/040,742.
USPTO; Final Office Action dated Oct. 28, 2009 for U.S. Appl. No. 12/040,786.
USPTO; Advisory Action dated Nov. 4, 2009 for U.S. Appl. No. 12/040,802.
USPTO; Office Action dated Dec. 7, 2009 for U.S. Appl. No. 12/040,767.
USPTO; Office Action dated Dec. 14, 2009 for U.S. Appl. No. 12/040,802.
USPTO; Non-Final Office Action dated Jan. 29, 2010 for U.S. Appl. No. 12/040,809.
USPTO; Non-Final Office Action dated Jan. 29, 2010 for U.S. Appl. No. 12/040,795.
USPTO; Non-Final Office Action dated Jan. 29, 2010 for U.S. Appl. No. 12/040,781.
USPTO; Non-Final Office Action dated Jan. 29, 2010 for U.S. Appl. No. 12/040,742.
USPTO; Advisory Action dated Sep. 21, 2009 for U.S. Appl. No. 12/040,767.
USPTO; Final Office Action dated May 14, 2010 for U.S. Appl. No. 12/040,767.
USPTO; Advisory Action dated Jul. 23, 2010 for U.S. Appl. No. 12/040,767.
USPTO; Advisory Action dated Oct. 21, 2009 for U.S. Appl. No. 12/040,757.
USPTO; Non-Final Office Action dated Mar. 18, 2010 for U.S. Appl. No. 12/040,786.
USPTO; Final Office Action dated Jun. 24, 2010 for U.S. Appl. No. 12/040,802.
USPTO; Final Office Action dated Jul. 20, 2010 for U.S. Appl. No. 12/040,742.
USPTO; Final Office Action dated Jul. 20, 2010 for U.S. Appl. No. 12/040,781.
USPTO; Final Office Action dated Jul. 20, 2010 for U.S. Appl. No. 12/040,809.
USPTO; Advisory Action dated Sep. 2, 2010 for U.S. Appl. No. 12/040,757.
USPTO; Advisory Action dated Oct. 6, 2010 for U.S. Appl. No. 12/040,742.
Jeremy Simon, Credit card issuers may reduce credit limits, CreditCards.com, Jun. 29, 2007 (CredRisk).
USPTO; Final Office Action dated Jul. 21, 2010 for U.S. Appl. No. 12/040,795.
Martin Blackwell and Chris Sykes, The Assignment of credit limits with a behavior-scoring system, 1992, IMA Journal of Management Mathematics 1992 4(1); pp. 73-80 (Scoring).
USPTO; Notice of Allowance dated Sep. 7, 2010 for U.S. Appl. No. 12/040,786.
Distribution of credit risk among providers of mortgages to lower-income and minority homebuyers, Federal Reserve Bulletin, v82, n12, p. 1077(26), Dec. 1996.
Frame, W. Scott; White, Lawrence J.; Charter Value, risk-taking incentives, and emerging competition for Fannie Mae and Freddie Mac. (Federal National Mortgage Association, Federal Home Loan Mortgage Corporation), Journal of Money, Credit & Banking, 39, 1, 83(21), Feb. 2007.
USPTO; Advisory Action dated Jan. 14, 2010 for U.S. Appl. No. 12/040,786.
USPTO; Advisory Action dated Oct. 6, 2010 for U.S. Appl. No. 12/040,795.
USPTO; Office Action dated Jan. 24, 2011 for U.S. Appl. No. 12/040,795.

(56) References Cited

OTHER PUBLICATIONS

USPTO; Final Office Action dated Sep. 2, 2009 for U.S. Appl. No. 12/040,802.
USPTO; Advisory Action dated Sep. 2, 2010 for U.S. Appl. No. 12/040,802.
USPTO; Notice of Allowance dated Oct. 12, 2010 for U.S. Appl. No. 12/040,802.
USPTO; Advisory Action dated Oct. 6, 2010 for U.S. Appl. No. 12/040,809.
USPTO; Office Action dated Jan. 24, 2011 for U.S. Appl. No. 12/040,809.
USPTO; Office Action dated Dec. 8, 2010 for U.S. Appl. No. 12/938,247.
USPTO; Office Action dated Jan. 24, 2011 for U.S. Appl. No. 12/040,742.
USPTO; Notice of Allowance dated Oct. 14, 2010 for U.S. Appl. No. 12/040,757.
USPTO; Final Office Action dated Jun. 25, 2010 for U.S. Appl. No. 12/040,757.
USPTO; Office Action dated Dec. 14, 2009 for U.S. Appl. No. 12/040,757.
USPTO; Final Office Action dated Sep. 1, 2009 for U.S. Appl. No. 12/040,757.
USPTO; Office Action dated Mar. 9, 2009 for U.S. Appl. No. 12/040,757.
USPTO; Office Action dated Jan. 24, 2011 for U.S. Appl. No. 12/040,781.
USPTO; Notice of Allowance dated Mar. 22, 2011 for U.S. Appl. No. 12/938,247.
Final Office Action dated Jun. 29, 2011 for U.S. Appl. No. 12/040,809.
Final Office Action dated Jun. 29, 2011 for U.S. Appl. No. 12/040,742.
Final Office Action dated Jun. 29, 2011 for U.S. Appl. No. 12/040,781.
Final Office Action dated Jun. 29, 2011 for U.S. Appl. No. 12/040,795.
Advisory Action dated Dec. 7, 2011 for U.S. Appl. No. 12/040,809.
Advisory Action dated Sep. 7, 2011 in U.S. Appl. No. 12/040,742.
Advisory Action dated Sep. 7, 2011 in U.S. Appl. No. 12/040,781.
Advisory Action dated Sep. 12, 2011 in U.S. Appl. No. 12/040,795.
Office Action dated Nov. 10, 2011 in U.S. Appl. No. 12/040,742.
Office Action dated Nov. 10, 2011 in U.S. Appl. No. 12/040,781.
Office Action dated Nov. 10, 2011 in U.S. Appl. No. 12/040,795.
Advisory Action dated Dec. 7, 2011 in U.S. Appl. No. 12/040,809.
Final Office Action dated Feb. 6, 2012 in U.S. Appl. No. 13/165,701.
Office Action dated Mar. 15, 2012 in U.S. Appl. No. 13/397,934.
Office Action dated Mar. 15, 2012 in U.S. Appl. No. 13/397,972.
Office Action dated Mar. 16, 2012 in U.S. Appl. No. 13/398,456.
Office Action dated Mar. 15, 2012 in U.S. Appl. No. 13/398,466.
Final Office Action dated Jun. 29, 2012 in U.S. Appl. No. 13/397,934.
Final Office Action dated Jun. 25, 2012 in U.S. Appl. No. 13/397,972.
Final Office Action dated Jun. 27, 2012 in U.S. Appl. No. 13/398,456.
Final Office Action dated Jun. 27, 2012 in U.S. Appl. No. 13/398,466.
Advisory Action dated Sep. 10, 2012 in U.S. Appl. No. 13/397,934.
Advisory Action dated Sep. 10, 2012 in U.S. Appl. No. 13/397,972.
Advisory Action dated Sep. 10, 2012 in U.S. Appl. No. 13/398,466.
Advisory Action dated Sep. 11, 2012 in U.S. Appl. No. 13/398,456.
Avery, R.B., Bostic, R.W., Calem, P.S., & Canner, G.B. (1996). "Credit risk, credit scoring, and the performance of home mortgages", Federal Reserve Bulletin, 82(7), 621-621, retrieved Feb. 14, 2013.
Noe, J. (1997). "Credit scoring", America's Community Banker, 6(8), 29-33, retrieved Feb. 14, 2013.
Notice of Allowance dated Feb. 20, 2013 in U.S. Appl. No. 12/040,767.

\* cited by examiner

| From Experian TrendView | | | From ComScore Data | | | |
|---|---|---|---|---|---|---|
| Balance 3 | Balance 2 | Balance 1 | Purchase Volume | Last Payment | Previous Balance | New Balance |
| 219 | 25 | 229 | 1465.47 | 1263.39 | 25.51 | 229.12 |
| 37 | 2 | 566 | 1187.14 | 650.64 | 2.64 | 566.11 |
| 6928 | 9192 | 27 | 10162.2 | 19354.84 | 9192.55 | 27.56 |
| 1434 | 32 | 54 | 1021.95 | 1000 | 3205 | 54 |

FIGURE 3

TOTAL STRUCTURAL RISK MODEL

CROSS REFERENCE TO RELATED APPLICATIONS

This application is a continuation of, and claims the benefit of, U.S. Ser. No. 12/938,247, filed Nov. 2, 2010, and entitled "TOTAL STRUCTURAL RISK MODEL." The '247 application is a continuation of, and claims the benefit of, U.S. Pat. No. 7,849,004, issued on Dec. 7, 2010, and entitled "TOTAL STRUCTURAL RISK MODEL" (fka U.S. patent application Ser. No. 12/040,757, filed Feb. 29, 2008). All of which are hereby incorporated by reference in their entirety.

FIELD OF INVENTION

The present invention generally relates to financial data processing, and more particularly, to a system and method for credit scoring, consumer profiling, consumer behavior analysis and modeling.

BACKGROUND OF THE INVENTION

It is axiomatic that consumers will tend to spend more when they have greater purchasing power. The capability to accurately estimate a consumer's risk of default may allow a financial institution (such as a credit company, lender or any consumer services companies) to better target potential prospects and identify any opportunities to increase consumer transaction volumes, without an undue increase in the risk of defaults. Attracting additional consumer spending, in turn, would often increase such financial institution's revenues, primarily in the form of an increase in transaction fees and interest payments received. Consequently, a consumer model that can accurately estimate risk of default is of paramount interest to many financial institutions and other consumer services companies.

Sufficient systems are not available for appropriately estimating a consumer's risk of default. The existing system typically includes limited and incomplete consumer information from credit bureaus and the like at the aggregate and individual consumer levels. In order to achieve a more complete picture of a consumer's risk of default, one must examine in detail a larger range of a consumer's financial accounts, including credit accounts, checking and savings accounts, investment portfolios, and the like. However, the vast majority of consumers do not maintain all such accounts with the same financial institution and access to detailed financial information from other financial institutions is restricted by consumer privacy laws, disclosure policies and security concerns.

Accordingly, there is a need for a system and method for suitably modeling a consumer's risk of default which addresses certain problems of existing technologies.

SUMMARY OF THE INVENTION

The invention includes a method for determining a comprehensive consumer default risk value for a consumer. An exemplary method comprises obtaining consumer credit data relating to the consumer, modeling consumer spending patterns of the consumer using the consumer credit data to obtain an estimated spend capacity of the consumer, and calculating the comprehensive consumer default risk value for the consumer based upon the consumer credit data and the estimated spend capacity. The method may optionally include obtaining internal data relating to the consumer and further calculating comprehensive consumer default risk value for the consumer based upon said internal data.

In various embodiments, the invention includes determining a comprehensive mortgage consumer default risk value for a consumer. An exemplary method includes obtaining consumer credit data relating to the consumer, modeling consumer spending patterns of the consumer using the consumer credit data to obtain an estimated spend capacity of the consumer, and calculating the comprehensive consumer default risk value for the consumer based upon the consumer credit data and the estimated spend capacity. The method may optionally include obtaining internal data relating to the consumer and further calculating comprehensive consumer default risk value for the consumer based upon said internal data.

The present invention may also allow an issuer to create a risk model for use in targeting potential consumers, make credit decisions regarding existing consumers, and increase business with business partners.

BRIEF DESCRIPTION OF THE DRAWINGS

FIG. 3 is a diagram of exemplary financial data used for model generation and validation, in accordance with an exemplary embodiment of the present invention.

DETAILED DESCRIPTION

Figure 1:
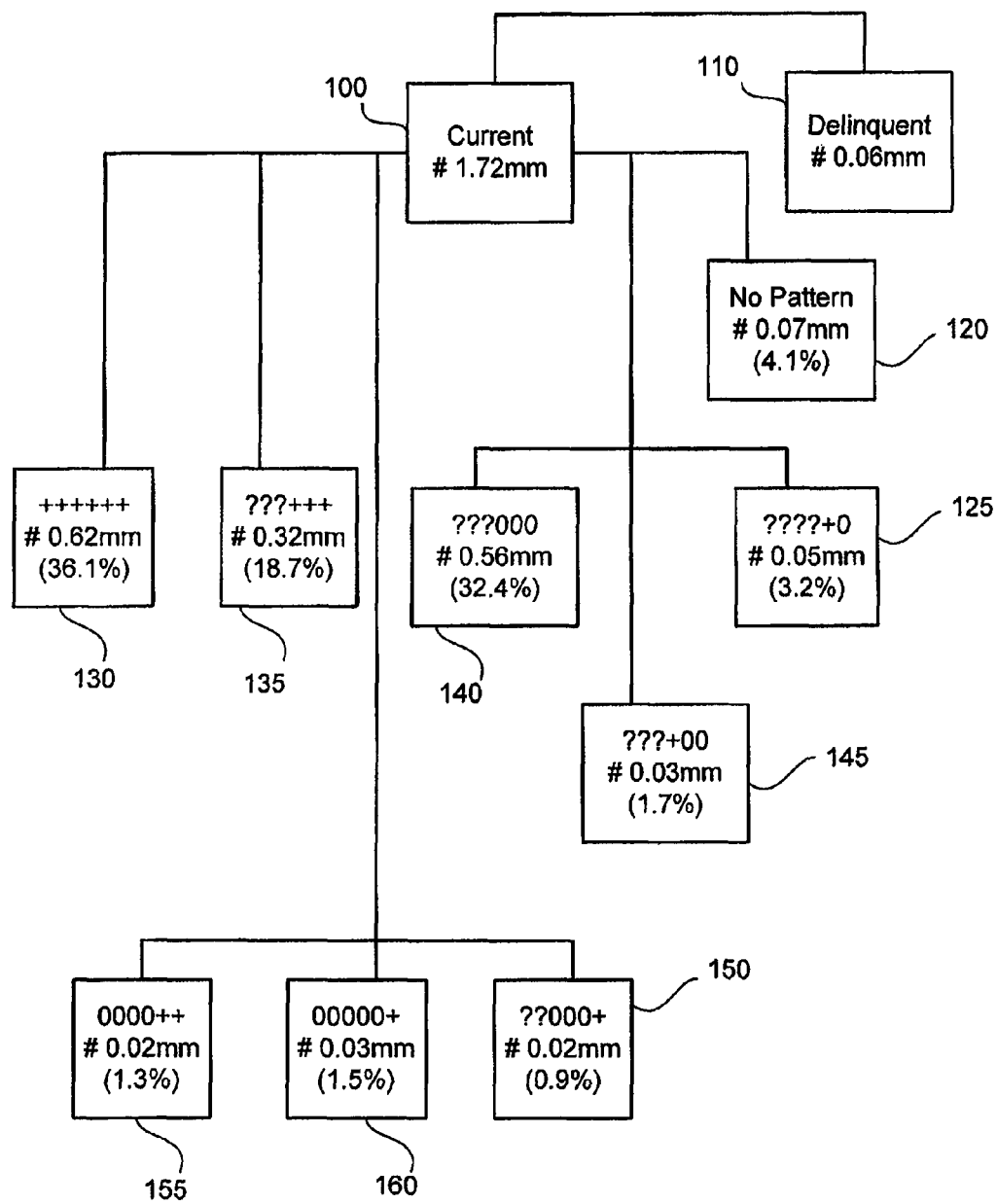
FIG. 1 is a diagram of exemplary categories of consumers, in accordance with an exemplary embodiment of the present invention.

The detailed description herein is presented for purposes of illustration only and not of limitation. For example, the steps recited in any of the method or process descriptions may be executed in any order and are not limited to the order presented. For the sake of brevity, conventional data networking, application development and other functional aspects of the systems (and components of the individual operating components of the systems) may not be described in detail herein. Although the present invention is described as relating to risk modeling of individual consumers, one of skill in the pertinent arts will recognize that the various embodiments of the invention can also apply to small businesses and organizations without departing from the spirit and scope of the present invention.

Modeling Consumer Risk

Modeling consumer risk includes, in one embodiment, obtaining consumer data, modeling and/or processing the consumer data, and creating an output. The output may then be used to make business decisions. In various embodiments, the present invention uses a variety of data (e.g., consumer data) in conjunction with several modeling/processing procedures to assess risk.

A debt obligation includes any obligation a consumer has to pay a lender money. Any extension of credit from a lender to a consumer is also considered a debt obligation. A debt obligation may be secured or unsecured. Secured obligations may be secured with either real or personal property. A loan or a credit account are types of debt obligations. A security backed by debt obligations is considered a debt obligation itself. A mortgage includes a loan, typically in the form of a promissory note, secured by real property. The real property may be secured by any legal means, such as, for example, via a mortgage or deed of trust. For convenience, a mortgage is used herein to refer to a loan secured by real property. An automobile loan includes a loan, typically in the form of a promissory note, which is secured by an automobile. For convenience, an automobile loan is used herein to refer to a loan secured by an automobile.

A lender is any person, entity, software and/or hardware that provides lending services. A lender may deal in secured or unsecured debt obligations. A lender may engage in secured debt obligations where either real or personal property acts as collateral. A lender need not originate loans but may hold securities backed by debt obligations. A lender may be only a subunit or subdivision of a larger organization. A mortgage holder includes any person or entity that is entitled to repayment of a mortgage. An automobile loan holder is any person or entity that is entitled to repayment of an automobile loan. As used herein, the terms lender and credit issuer may be used interchangeably. Credit issuers may include financial services companies that issue credit to consumers.

A trade or tradeline includes a credit or charge vehicle typically issued to an individual consumer by a credit grantor. Types of tradelines include, for example, bank loans, credit card accounts, retail cards, personal lines of credit and car loans/leases.

Tradeline data describes the consumer's account status and activity such as, for example, names of companies where the consumer has accounts, dates such accounts were opened, credit limits, types of accounts, balances over a period of time and summary payment histories. Tradeline data is generally available for the vast majority of actual consumers. Tradeline data, however, typically does not include individual transaction data, which is largely unavailable because of consumer privacy protections. Tradeline data may be used to determine both individual and aggregated consumer spending patterns, as described herein.

Internal data is any data a credit issuer possesses or acquires pertaining to a particular consumer. Internal data may be gathered before, during, or after a relationship between the credit issuer and the consumer. Such data may include consumer demographic data. Consumer demographic data includes any data pertaining to a consumer. Consumer demographic data may include consumer name, address, telephone number, email address, employer and social security number. Consumer transactional data is any data pertaining to the particular transactions in which a consumer engages during any given time period. Consumer transactional data may include transaction amount, transaction time, transaction vendor/merchant, and transaction vendor/merchant location. Transaction vendor/merchant location may contain a high degree of specificity to a vendor/merchant. For example, transaction vendor/merchant location may include a particular gasoline filing station in a particular postal code located at a particular cross section or address. Also for example, transaction vendor/merchant location may include a particular web address, such as a Uniform Resource Locator ("URL"), an email address and/or an Internet Protocol ("IP") address for a vendor/merchant. Transaction vendor/merchant location may also include information gathered from a WHOIS database pertaining to the registration of a particular web or IP address. WHOIS databases include databases that contain data pertaining to Internet IP address registrations. Transaction vendor/merchant, and transaction vendor/merchant location may be associated with a particular consumer and further associated with sets of consumers. Consumer payment data includes any data pertaining to a consumer's history of paying debt obligations. Consumer payment data may include consumer payment dates, payment amounts, balance amount, and credit limit. Internal data may further comprise records of consumer service calls, complaints, requests for credit line increases, questions, and comments. A record of a consumer service call includes, for example, date of call, reason for call, and any transcript or summary of the actual call.

Internal data may further comprise closed-loop data and open-loop data. Closed-loop data includes data obtained from a credit issuer's closed-loop transaction system. A closed-loop transaction system includes transaction systems under the control of one party. Closed-loop transaction systems may be used to obtain consumer transactional data. Open-loop data includes data obtained from a credit issuer's open-loop transaction system. An open-loop transaction system includes transaction systems under the control of multiple parties. Credit bureau data is any data retained by a credit bureau pertaining to a particular consumer. A credit bureau is any organization that collects and/or distributes consumer data. A credit bureau may be a consumer reporting agency. Credit bureaus generally collect financial information pertaining to consumers. Credit bureau data may include consumer account data, credit limits, balances, and payment history. Credit bureau data may include credit bureau scores that reflect a consumer's creditworthiness. Credit bureau scores are developed from data available in a consumer's file, such as the amount of lines of credit, payment performance, balance, and number of tradelines. The data available in a consumer's file is used to model the risk of a consumer over a period of time using statistical regression analysis. In one embodiment, those data elements that are found to be indicative of risk are weighted and combined to determine the credit score. For example, each data element may be given a score, with the final credit score being the sum of the data element scores.

Any transaction account or credit account discussed herein may include an account or an account number. An "account" or "account number", as used herein, may include any device, code, number, letter, symbol, digital certificate, smart chip, digital signal, analog signal, biometric or other identifier/indicia suitably configured to allow the consumer to access, interact with or communicate with the system (e.g., one or more of an authorization/access code, personal identification number (PIN), Internet code, other identification code, and/or the like). The account number may optionally be located on or associated with a rewards card, charge card, credit card, debit card, prepaid card, telephone card, embossed card, smart card, magnetic stripe card, bar code card, transponder, radio frequency card or an associated account. The system may include or interface with any of the foregoing cards or devices, or a fob having a transponder and RFID reader in RF communication with the fob. Although the system may include a fob embodiment, the invention is not to be so limited. Indeed, system may include any device having a transponder which is configured to communicate with RFID reader via RF communication. Typical devices may include, for example, a key ring, tag, card, cell phone, wristwatch or any such form capable of being presented for interrogation. Moreover, the system, computing unit or device discussed herein may include a "pervasive computing device," which may include a traditionally non-computerized device that is embedded with a computing unit. Examples can include watches, Internet enabled kitchen appliances, restaurant tables embedded with RF readers, wallets or purses with imbedded transponders, etc.

To model consumer spending power, consumer spend may be determined over previous periods of time (sometimes referred to herein as the consumer's size of wallet) from tradeline data sources. The share of wallet by tradeline or account type may also be determined. The size of wallet ("SoW") is represented by a consumer's or business' total aggregate spending and the share of wallet represents how the consumer uses different payment instruments. Methods and apparatus for calculating the size of wallet have been disclosed in U.S. patent application Ser. No. 11/169,588 which was published with publication number 2006-0242046 A1, the disclosure of which is hereby incorporated by reference in its entirety. Methods and apparatus for calculating the size of wallet have also been disclosed in U.S. patent application Ser. No. 11/586,737 which was published with publication number US 2007-0226130 A1, the disclosure of which is hereby incorporated by reference in its entirety. Exemplary size of wallet determinations will now be discussed in detail.

Consumer panel data measures consumer spending patterns from information that is provided by, typically, millions of participating consumer panelists. Exemplary consumer panel data is available through various consumer research companies, such as comScore Networks, Inc. of Reston, Va. Consumer panel data may include individual consumer information such as, for example, credit risk scores, credit card application data, credit card purchase transaction data, credit card statement views, tradeline types, balances, credit limits, purchases, balance transfers, cash advances, payments made, finance charges, annual percentage rates and fees charged. Such individual information from consumer panel data, however, may be limited to those consumers who have participated in the consumer panel, and so such detailed data may not be available for all consumers. One skilled in the art will appreciate that the use of the term "computer" or any similar term includes any type of hardware or software in which a host is able to acquire information. Such computers may include personal computers, personal digital assistants, biometric devices, transaction account devices, loyalty accounts and/or the like.

As shown in FIG. 1, a population of consumers for which individual and/or aggregated data has been provided may be divided into two general categories for analysis, for example, those that are current on their credit accounts (representing 1.72 million consumers in the exemplary data sample size of 1.78 million consumers) and those that are delinquent (representing 0.06 million of such consumers). In one embodiment, delinquent consumers may be discarded from the populations being modeled.

In further embodiments, the population of current consumers is subdivided into a plurality of further categories based on the amount of balance information available and the balance activity of such available data. In the example shown in FIG. 1, the amount of balance information available is represented by a string of '+' '0' and '?' characters. Each character represents one month of available data, with the rightmost character representing the most current months and the leftmost character representing the earliest month for which data is available. In the example provided in FIG. 1, a string of six characters is provided, representing the six most recent months of data for each category. The '+" character represents a month in which a credit account balance of the consumer has increased. The "0" character may represent months where the account balance is zero. The "?" character represents months for which balance data is unavailable. Also provided in FIG. 1 is number of consumers that fall into each category and the percentage of the consumer population they represent in that sample.

In further embodiments, only certain categories of consumers may be selected for modeling behavior. The selection may be based on those categories that demonstrate increased spend on their credit balances over time. However, it should be readily appreciated that other categories can be used. FIG. 1 shows an example of two categories of selected consumers for modeling (+++++, ???+++). These groups show the availability of at least the three most recent months of balance data and that the balances increased in each of those months.

Figure 2:
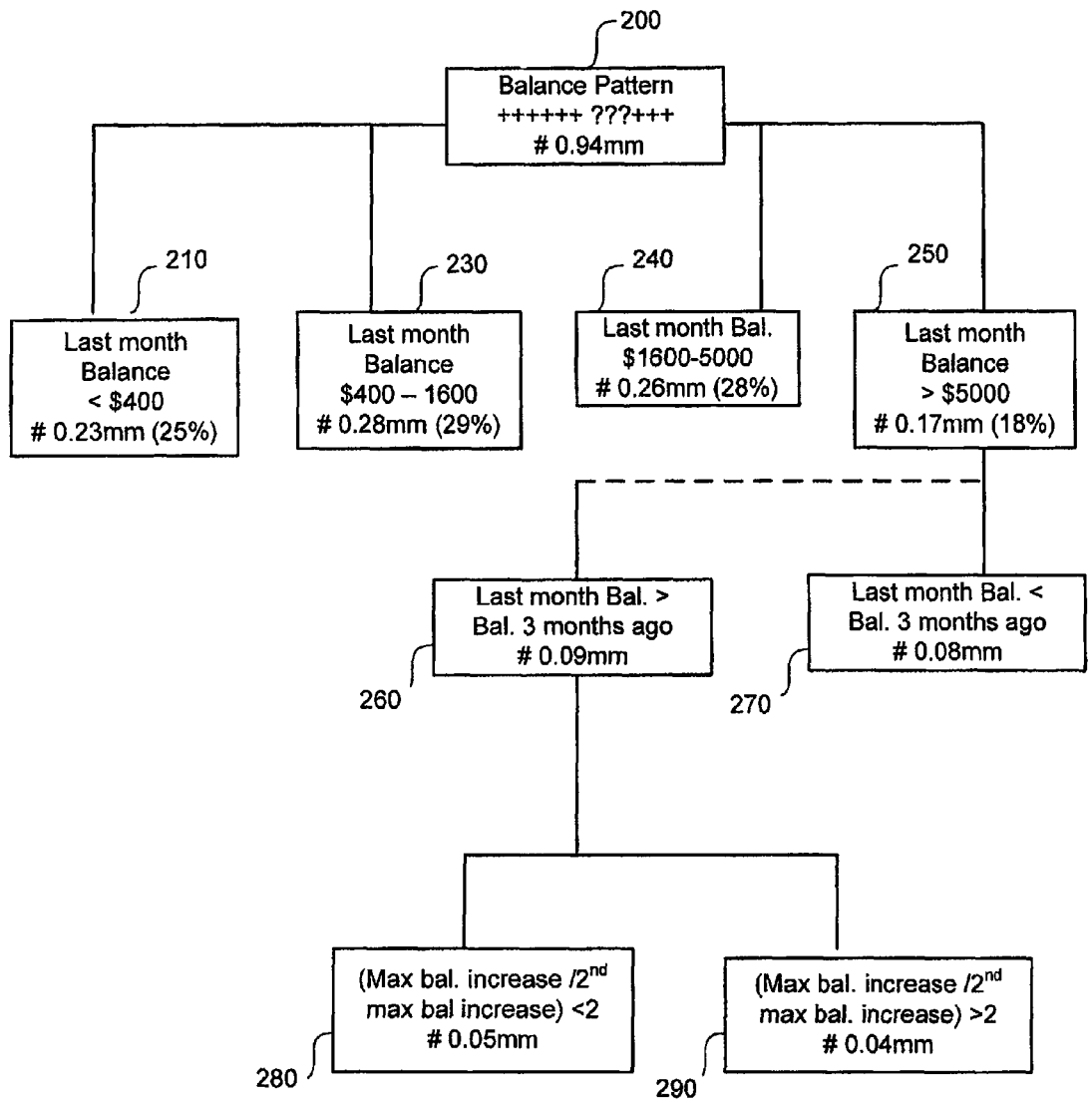
FIG. 2 is a diagram of exemplary subcategories of consumers, in accordance with an exemplary embodiment of the present invention.

Turning now to FIG. 2, which shows sub-categorization of the two categories (+++++, ???+++) that are selected for modeling. In the embodiment shown, the sub-categories may include: consumers having a most recent credit balance less than $400; consumers having a most recent credit balance between $400 and $1600; consumers having a most recent credit balance between $1600 and $5000; consumers whose most recent credit balance is less than the balance of, for example, three months ago; consumers whose maximum credit balance increase over, for example, the last twelve months divided by the second highest maximum balance increase over the same period is less than 2; and consumers whose maximum credit balance increase over the last twelve months divided by the second highest maximum balance increase is greater than 2. It should be readily appreciated that other subcategories can be used. Each of these subcategories is defined by their last month balance level. The number of consumers from the sample population (in millions) and the percentage of the population for each category are also shown in FIG. 2.

There may be a certain balance threshold established, wherein if a consumer's account balance is too high, their behavior may not be modeled, since such consumers are less likely to have sufficient spending ability. In another embodiment, consumers having balances above such threshold may be sub-categorized yet again, rather than completely discarded from the sample. In the example shown in FIG. 2, the threshold value may be $5000, and only those having particular historical balance activity may be selected, i.e. those consumers whose present balance is less than their balance three months earlier, or whose maximum balance increase in the examined period meets certain parameters. Other threshold values may also be used and may be dependent on the individual and aggregated consumer data provided.

The models generated may be derived, validated and refined using tradeline and consumer panel data. An example of tradeline data 500 from Experian and consumer panel data 502 from comScore is represented in FIG. 3. Each row of the data represents the record of one consumer and thousands of such records may be provided at a time. The statement shows the point-in-time balance of consumers accounts for three successive months (Balance 1, Balance 2 and Balance 3). The data shows each consumer's purchase volume, last payment amount, previous balance amount and current balance. Such information may be obtained, for example, by page scraping the data (in any of a variety of known manners using appropriate application programming interfaces) from an Internet web site or network address at which the data is displayed.

Furthermore, the data may be matched by consumer identity and combined by one of the data providers or another third party independent of the financial institution. Validation of the models using the combined data may then be performed, and such validation may be independent of consumer identity.

Figure 4:
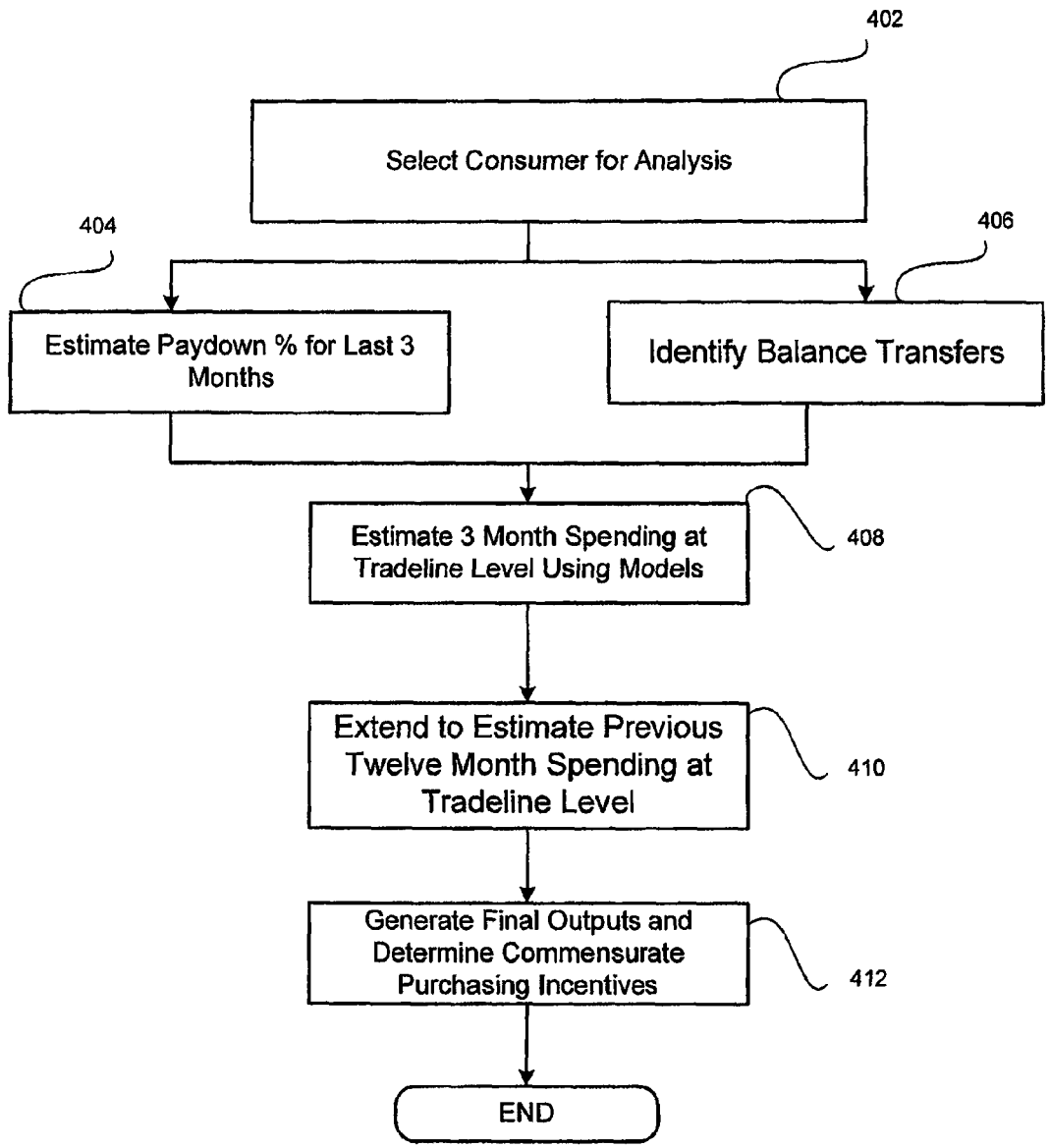
FIG. 4 is a flowchart of an exemplary process for estimating the spend ability of a consumer, in accordance with an exemplary embodiment of the present invention.

Turning now to FIG. 4, an exemplary process for estimating the size of an individual consumer's spending wallet is shown. Upon completion of the modeling of the consumer categories above, the process commences with the selection of individual consumers or prospects to be examined (step 602). An appropriate model derived for each category will then be applied to the presently available consumer trade line information in the following manner to determine, based on the results of application of the derived models, an estimate of a consumer's size of wallet. Each consumer of interest may be selected based on their falling into one of the categories selected for modeling described above, or may be selected using any of a variety of criteria.

The process continues to step 604 where, for a selected consumer, a paydown percentage over a previous period of time is estimated for each of the consumer's credit accounts. In one embodiment, the paydown percentage is estimated over the previous three-month period of time based on available tradeline data, and may be calculated according to the following formula:

Pay-down %=(The sum of the last three months payments from the account)/(The (The sum of three month balances for the account based on tradeline data).

The paydown percentage may be set to, for example, 2%, for any consumer exhibiting less than a 5% paydown percentage, and may be set to 100% if greater than 80%, as a simplified manner for estimating consumer spending behaviors on either end of the paydown percentage scale.

Consumers that exhibit less than a 50% paydown during a three month period may be categorized as revolvers, while consumers that exhibit a 50% paydown or greater may be categorized as transactors. These categorizations may be used to initially determine what, if any, purchasing incentives may be available to the consumer, as described later below.

The process then continues to step 606, where balance transfers for a previous period of time are identified from the available tradeline data for the consumer. Although tradeline data may reflect a higher balance on a credit account over time, such higher balance may simply be the result of a transfer of a balance into the account, and are thus not indicative of a true increase in the consumer's spending. It is difficult to confirm balance transfers based on tradeline data since the information available is not provided on a transaction level basis. In addition, there are typically lags or absences of reporting of such values on tradeline reports.

Nonetheless, marketplace analysis using confirmed consumer panel and internal consumer financial records has revealed reliable ways in which balance transfers into an account may be identified from imperfect individual tradeline data alone. Three exemplary reliable methods for identifying balance transfers from credit accounts, each which is based in part on actual consumer data sampled, are as follows.

It should be readily apparent that the formulas in the form recited above are not necessary for all embodiments of the present process and may vary based on the consumer data used to derive them.

A first rule identifies a balance transfer for a given consumer's credit account as follows. The month having the largest balance increase in the tradeline data, and which satisfies the following conditions, may be identified as a month in which a balance transfer has occurred:

The maximum balance increase is greater than twenty times the second maximum balance increase for the remaining months of available data;
The estimated pay-down percentage calculated at step 606 above is less than 40%; and
The largest balance increase is greater than $1000 based on the available data.

A second rule identifies a balance transfer for a given consumer's credit account in any month where the balance is above twelve times the previous month's balance and the next month's balance differs by no more than 20%.

A third rule identifies a balance transfer for a given consumer's credit account in any month where:
the current balance is greater than 1.5 times the previous month's balance;
the current balance minus the previous month's balance is greater than $4500; and
the estimated pay-down percent from step 606 above is less than 30%.

The process then continues to step 608, where consumer spending on each credit account is estimated over the next, for example, three month period. In estimating consumer spend, any spending for a month in which a balance transfer has been identified from individual tradeline data above is set to zero for purposes of estimating the size of the consumer's spending wallet, reflecting the supposition that no real spending has occurred on that account. The estimated spend for each of the three previous months may then be calculated as follows:

Estimated spend=(the current balance−the previous month's balance+(the previous month's balance*the estimated pay-down % from step 604 above).

The exact form of the formula selected may be based on the category in which the consumer is identified from the model applied, and the formula is then computed iteratively for each of the three months of the first period of consumer spend.

Next, at step 610, the estimated spend is then extended over, for example, the previous three quarterly or three-month periods, providing a most-recent year of estimated spend for the consumer.

Finally, at step 612, the data output from step 610, in turn may be used to generate a plurality of final outputs for each consumer account. These may be provided in an output file that may include a portion or all of the following exemplary information, based on the calculations above and information available from individual tradeline data:
(i) size of previous twelve month spending wallet; (ii) size of spending wallet for each of the last four quarters; (iii) total number of revolving cards, revolving balance, and average pay down percentage for each; (iv) total number of transacting cards, and transacting balances for each; (v) the number of balance transfers and total estimated amount thereof; (vi) maximum revolving balance amounts and associated credit limits; and (vii) maximum transacting balance and associated credit limit.

After step 612, the process may end with respect to the examined consumer. It should be readily appreciated that the process may be repeated for any number of current consumers or consumer prospects.

Such estimated spending may be calculated in a rolling manner across each previous three month (quarterly) period. For example, spending in each of a first three months of a first quarter may be calculated based on balance values, the category of the consumer based on the above referenced consumer categorization spending models and the formulas used in steps 604 and 606. Calculation may continue every three months, using the previous three months' data as an input.

It should be readily appreciated that as the rolling calculations proceed, the consumer's category may change based on the outputs that result, and therefore, different formula corresponding to the new category may be applied to the consumer for different periods of time. The rolling manner described above maximizes the known data used for estimating consumer spend in a previous twelve month period. Based on the final output generated for the consumer, commensurate purchasing incentives may be identified and provided to the consumer, for example, in anticipation of an increase in the consumer's purchasing ability as projected by the output file. In such cases, consumers of good standing, who are categorized as transactors with a projected increase in purchasing ability, may be offered a lower financing rate on purchases made during the period of expected increase in their purchasing ability, or may be offered a discount or rebate for transactions with selected merchants during that time.

It should be readily appreciated that as the rolling calculations proceed, the consumer's category may change based on the outputs that result. Therefore, different formula corresponding to the new category may be applied to the consumer for different periods of time. The rolling manner described above maximizes the known data used for estimating consumer spend in a previous twelve month period Based on the final output generated for the consumer, commensurate purchasing incentives may be identified and provided to the consumer, for example, in anticipation of an increase in the consumer's purchasing ability as projected by the output file. In such cases, consumers of good standing, who are categorized as transactors with a projected increase in purchasing ability, may be offered a lower financing rate on purchases made during the period of expected increase in their purchasing ability, or may be offered a discount or rebate for transactions with selected merchants during that time.

In another example, and in the case where a consumer is a revolver, a consumer with a projected increase in purchasing ability may be offered a lower annual percentage rate on balances maintained on their credit account. Other like promotions and enhancements to consumers' experiences are well known and may be used within the processes disclosed herein.

Prospective consumer populations used for modeling and/or later evaluation may be provided from any of a plurality of available marketing groups, or may be culled from credit bureau data, targeted advertising campaigns or the like. Testing and analysis may be continuously performed to identify the optimal placement and required frequency of such sources for using the size of spending wallet calculations. The processes described herein may also be used to develop models for predicting a size of wallet for an individual consumer in the future.

Institutions adopting the processes disclosed herein may expect to more readily and profitably identify opportunities for prospect and consumer offerings, which in turn provides enhanced experiences across all parts of a consumer's lifecycle. In the case of a credit provider, accurate identification of spend opportunities allows for rapid provisioning of card member offerings to increase spend that, in turn, results in increased transaction fees, interest charges and the like. The careful selection of consumers to receive such offerings reduces the incidence of fraud that may occur in less disciplined cardmember incentive programs. The reduced incidence of fraud, in turn, reduces overall operating expenses for institutions.

As mentioned above, the process described may also be used to develop models for predicting a size of wallet for an individual consumer in the future. The capacity a consumer has for spending in a variety of categories is the share of wallet.

The model used to determine share of wallet for particular spend categories using the processes described herein is the share of wallet ("SoW") model. The SoW model provides estimated data and/or characteristics information that is more indicative of consumer spending power than typical credit bureau data or scores. The SoW model may output, with sufficient accuracy, data that is directly related to the spend capacity of an individual consumer. One of skill in the art will recognize that any one or combination of the following data types, as well as other data types, may be output by the SoW model without altering the spirit and scope of the present invention.

The size of a consumer's twelve-month spending wallet is an example output of the SoW model. A consumer's twelve-month spending wallet may be output as an actual or rounded dollar amount. The size of a consumer's spending wallet for each of several consecutive quarters, for example, the most recent four quarters, may also be output.

The SoW model output may include the total number of revolving cards held by a consumer, the consumer's revolving balance, and/or the consumer's average pay-down percentage of the revolving cards. The maximum revolving balance and associated credit limits can be determined for the consumer, as well as the size of the consumer's revolving spending.

Similarly, the SoW model output may include the total number of a consumer's transaction cards and/or the consumer's transaction balance. The SoW model may additionally output the maximum transacting balance, the associated credit limit, and/or the size of transactional spending of the consumer.

These outputs, as well as any other outputs from the SoW model, may be appended to data profiles of a company's consumers and prospects. The output enhances the company's ability to make decisions involving prospecting, new applicant evaluation, and consumer relationship management across the consumer lifecycle. The SoW score can focus, for example, on total spend, transaction account spend and/or a consumer's spending trend.

Using the processes described above, balance transfers are factored out of a consumer's spend capacity. Further, when correlated with a risk score, the SoW score may provide more insight into behavior characteristics of relatively low-risk consumers and relatively high-risk consumers.

The SoW score may be structured in one of several ways. For instance, the score may be a numeric score that reflects a consumer's spend in various ranges over a given time period, such as the last quarter or year. As an example, a score of 5000 might indicate that a consumer spent between $5000 and $6000 in the given time period.

The score may include a range of numbers or a numeric indicator, such as an exponent, that indicates the trend of a consumer's spend over a given time period. For example, a trend score of +4 may indicate that a consumer's spend has increased over the previous 4 months, while a trend score of −4 may indicate that a consumer's spend has decreased over the previous 4 months.

In addition to determining an overall SoW score, the SoW model outputs may each be given individual scores and used as attributes for consideration in credit score development by, for example, traditional credit bureaus. As discussed above, credit scores are traditionally based on information in a consumer's credit bureau file.

Outputs of the SoW model, such as balance transfer information, spend capacity and trend, and revolving balance information, may be more indicative of risk than some traditional data elements. Therefore, a company may use scored SoW outputs in addition to or in place of traditional data elements when computing a final credit score. SoW output information may be collected, analyzed, and/or summarized in a scorecard. Such a scorecard would be useful to, for example, credit bureaus, major credit grantors, and scoring companies, such as Fair Isaac Corporation of Minneapolis, Minn.

The SoW modeling, however, is only one potential component of the comprehensive consumer default risk that a consumer presents to a lender. A comprehensive consumer default risk value is a value that describes the risk that a consumer will default on any debt obligation. The debt obligation may be held by any lender or credit issuer. Calculating the comprehensive consumer default risk value can be done by any suitable means.

In various embodiments, the comprehensive consumer default risk value is calculated using a SoW output combined with credit bureau data. In various embodiments, internal data may be used in addition to a SoW output and credit bureau data.

Figure 5:
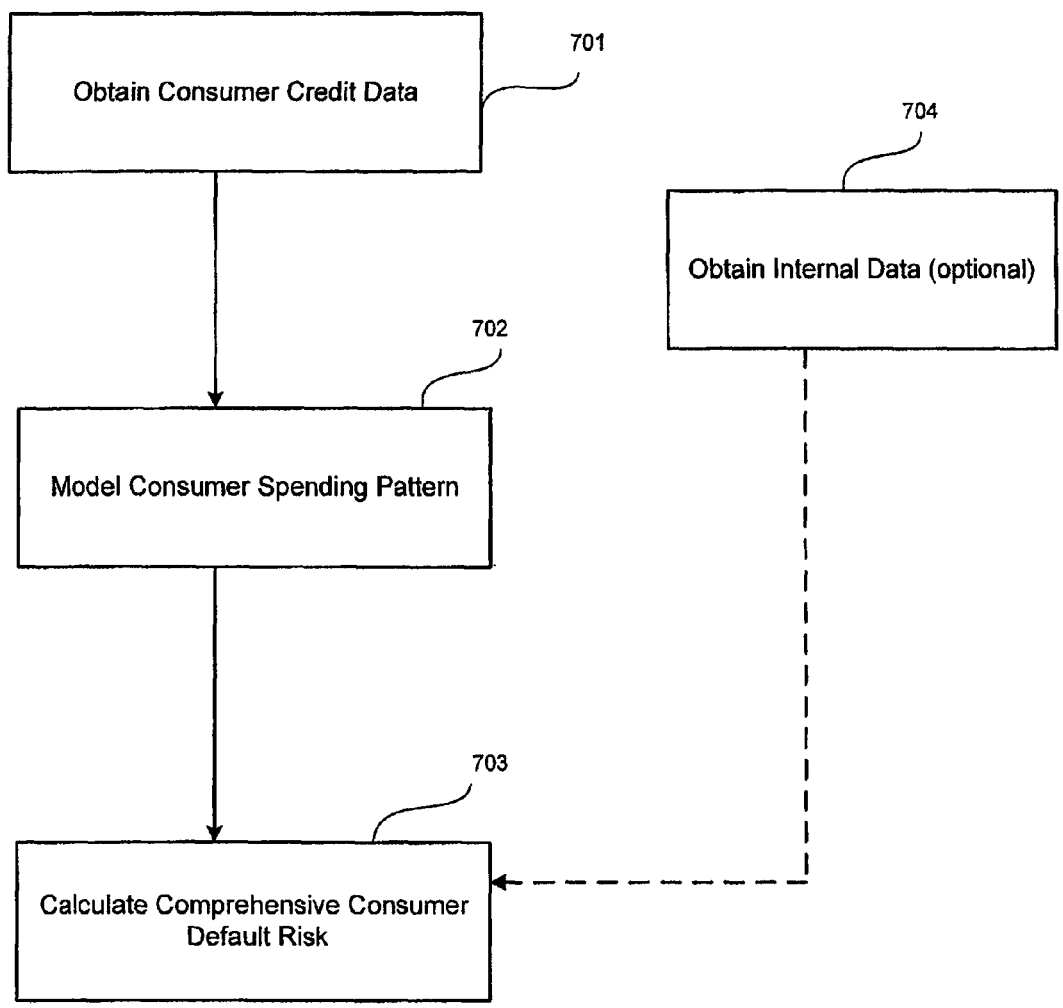
FIG. 5 is a flowchart of an exemplary process for modeling consumer default risk.

In various embodiments, calculating the comprehensive consumer default risk value involves, as depicted in FIG. 5, obtaining consumer credit data 701, modeling consumer spending patterns 702, and calculating a comprehensive consumer default risk value 703. Calculating the comprehensive consumer default risk value may also involve obtaining internal data for a given consumer 704.

Consumer credit data 701 may be obtained from any source such as, for example, a credit bureau. Modeling consumer spending patterns may include any process or method designed to assess the spending pattern of a consumer such as, for example, the SoW model.

Figure 6:
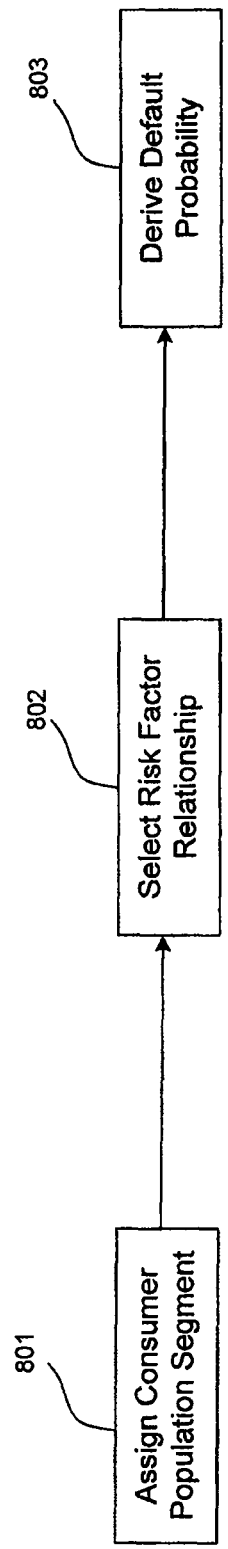
FIG. 6 is a flowchart of an exemplary process for calculating a comprehensive consumer default risk value.

Calculating the comprehensive consumer default risk value 703 may involve the process depicted in FIG. 6., namely, assigning a consumer population segment 801, selecting an appropriate risk factor relationship 802 and deriving a default probability 803 based upon said risk factor relationship. Assigning a consumer population segment 801 includes any method for assigning consumers into population segments. A consumer population segment 801 may be based upon, for example, high risk consumers and low risk consumers categories. A consumer population segment 801 may be based upon primary residence value. Selecting an appropriate risk factor relationship 802 may include any method of creating a relationship between risk factors. Selecting an appropriate risk factor relationship 802 may be dependent upon the assigned consumer population segment. Risk factors include any method of assessing risk. Risk factors may include risk factors derived from credit bureau data, internal data, merchant data, or any other factor that may be predictive of risk. A risk factor relationship 802 may take the form of, for example, an equation. An equation includes linear, exponential, and logarithmic equations. An equation may assign fixed coefficients associated with a particular risk factor. A coefficient in an equation may vary depending upon the particular consumer population segment assigned. Deriving a default probability 803 based upon said risk factor relationship 802 may take the form of, for example, an equation. An equation includes linear, exponential, and logarithmic equations. For example, a logarithmic equation may transform a risk relationship into a default probability 803. A default probability 803 may take the form of a probability value between 0 and 1.

Applicable Market Segments/Industries

Outputs of the total structural risk ("TSR") model can be used in any business or market segment that extends credit or otherwise needs to evaluate the creditworthiness of a particular consumer. For simplicity, these businesses will be referred to herein as falling into one of three categories: financial services companies, retail companies, and other companies.

The business cycle in each category may be divided into three phases: acquisition, retention, and disposal. The acquisition phase occurs when a business is attempting to gain new consumers. The acquisition phase includes, for example, targeted marketing, determining what products or services to offer a consumer, deciding whether to lend to a particular consumer and what the line size or loan should be, and deciding whether to buy a particular loan. The retention phase occurs after a consumer is already associated with the business. In the retention phase, the business interests shift to managing the consumer relationship through, for example, consideration of risk, determination of credit lines, cross-sell opportunities, increasing business from that consumer, and increasing the company's assets under management.

The disposal phase is entered when a business wishes to dissociate itself from a consumer or otherwise end the consumer relationship. The disposal phase can occur, for example, through settlement offers, collections, and sale of defaulted or near-default loans.

Financial services companies include, for example: banks and other lenders, mutual fund companies, financiers of leases and sales, life insurance companies, online brokerages, credit issuers, and loan buyers.

Banks and lenders can utilize the TSR model in all phases of the business cycle. One exemplary use is in relation to home equity loans and the rating given to a particular bond issue in the capital market. The TSR model applies to home equity lines of credit and automobile loans in a similar manner.

If the holder of a home equity loan, for example, borrows from the capital market, the loan holder issues asset-backed securities ("ABS"), or bonds, which are backed by receivables. The loan holder is thus an ABS issuer. The ABS issuer applies for an ABS rating, which is assigned based on the credit quality of the underlying receivables. One of skill in the art will recognize that the ABS issuer may apply for the ABS rating through any application means, without altering the spirit and scope of the present invention. In assigning a rating, the rating agencies weigh a loan's probability of default by considering the lender's underwriting and portfolio management processes. Lenders generally secure higher ratings by credit enhancement. Examples of credit enhancement include, for example, over-collateralization, buying insurance (such as wrap insurance), and structuring ABS (through, for example, senior/subordinate bond structures, sequential pay vs. parallel pay, etc.) to achieve higher ratings. Lenders and rating agencies take the probability of default into consideration when determining the appropriate level of credit enhancement.

During the acquisition phase of a loan, lenders may use the TSR model to improve their lending decisions. Before issuing the loan, lenders can evaluate a consumer's risk of default for making payments on the loan. Evaluation leads to fewer bad loans and a reduced probability of default for loans in the lender's portfolio. A lower probability of default means that, for a given loan portfolio that was originated using the TSR model, either a higher rating can be obtained with the same degree of over-collateralization, or the degree of over-collateralization can be reduced for a given debt rating. Thus, using the TSR model at the acquisition stage of the loan reduces the lender's overall borrowing cost and loan loss reserves.

During the retention phase of a loan, the TSR model can be used to track a consumer's varying degree of risk. Based on the TSR outputs, the lender can make various decisions regarding the consumer relationship. For example, a lender may use the TSR model to identify borrowers who become more likely to default. The credit lines of those borrowers which have not fully been drawn down can then be reduced. Selectively revoking unused lines of credit may reduce the probability of default for loans in a given portfolio and reduce the lender's borrowing costs. Selectively revoking unused lines of credit may also reduce the lender's risk by minimizing further exposure to a borrower that may already be in financial distress.

Also during the retention phase of a loan, the TSR model may allow lenders to identify consumers for further marketing of business partners. A lender may partner with other businesses that wish to sell their products and services to the lender's consumers. The lender can use the TSR model to identify consumers with a risk of default profile desired by its partners. The lender may then use that information to increase those consumers' spend with the business partner. For example, a particular merchant may want to market to low risk, high spend consumers. The lender may identify those consumers using the TSR model and either convey the information to the particular partner merchant and, in one embodiment, market the particular merchant's goods to the consumer directly.

During the disposal phase of a loan, the TSR model enables lenders to better predict the likelihood that a borrower will default. Once the lender has identified consumers who are in danger of default, the lender may select those likely to repay and extend settlement offers. Additionally, lenders can use the TSR model to identify which consumers are unlikely to pay and those who are otherwise not worth extending a settlement offer.

The TSR model allows lenders to identify loans with risk of default, allowing lenders, prior to default, to begin anticipating a course of action to take if default occurs. Because freshly defaulted loans obtain a higher sale price than loans that have been non-performing for longer time periods, lenders may sell these loans earlier in the default period, thereby reducing the lender's costs.

The ability to predict and manage risk before default, often results in a lower likelihood of default for loans in the lender's portfolio. Further, even in the event of a defaulted loan, the lender can detect the default early and thereby recoup a higher percentage of the value of that loan. A lender using the TSR model can thus show to the rating agencies that it uses a combination of tight underwriting criteria and robust post-lending portfolio management processes. Tight underwriting criteria and robust post-lending portfolio management processes enable the lender to increase the ratings of the ABS that are backed by a given pool or portfolio of loans and/or reduce the level of over-collateralization or credit enhancement in order to obtain a particular rating.

Turning to mutual funds, the TSR model may be used to manage the relationship with consumers who interact directly with the company. During the retention phase, if the mutual fund company concludes that a consumer's risk of default has decreased, the company can then market additional funds to the consumer. The company can also cross-sell other services to the consumer with greater confidence.

Financiers of leases or sales, such as automobile lease or sale financiers, can benefit from TSR outputs in much the same way as a bank or lender, as discussed above. In typical product financing, however, the amount of the loan or lease is based on the value of the product being financed. Therefore, there is generally no credit limit that needs to be revisited during the course of the loan. As there is no need to revisit credit limit, the TSR model is very useful to lease/sales finance companies during the acquisition and disposal phases of the business cycle.

Just as the TSR model can help loan holders determine that a particular loan is nearing default, loan buyers can use the model to evaluate the quality of a prospective purchase during the acquisition phase of the business cycle. The TSR model thus may assist loan buyers in avoiding or reducing the sale prices of loans that are in likelihood of default.

Aspects of the retail industry for which the TSR model would be advantageous include, for example: retail stores having private label cards, on-line retailers, and mail order companies.

There are two general types of credit and charge cards in the marketplace today: multipurpose cards and private label cards. A third type of hybrid card is emerging. Multipurpose cards are cards that can be used at multiple different merchants and service providers. For example, American Express, Visa, Mastercard, and Discover are considered multipurpose card issuers. Multipurpose cards are accepted by merchants and other service providers in what is often referred to as an "open network." Transactions are routed from a point-of-sale ("POS") through a network for authorization, transaction posting, and settlement.

A variety of intermediaries play different roles in the process. These include merchant processors, the brand networks, and issuer processors. An open network is often referred to as an interchange network. Multipurpose cards include a range of different card types, such as charge cards, revolving cards, and debit cards. Debit cards are linked to a consumer's demand deposit account ("DDA") or checking account.

Private label cards are cards that can be used for the purchase of goods and services from a single merchant or service provider. Historically, major department stores were the originators of private label cards. Private label cards are now offered by a wide range of retailers and other service providers. These cards are generally processed on a closed network, with transactions flowing between the merchant's POS and its own backoffice or the processing center for a third-party processor. These transactions do not flow through an interchange network and are not subject to interchange fees.

Recently, a type of hybrid card has evolved. A hybrid card, when used at a particular merchant, is that merchant's private label card, but when used elsewhere, becomes a multipurpose card. The particular merchant's transactions are processed in the proprietary private label network. Transactions made with the card at all other merchants and service providers are processed through an interchange network.

Private label card issuers, in addition to multipurpose card issuers and hybrid card issuers, can apply the TSR model in a similar way as described above with respect to credit card companies. That is, knowledge of a consumer's risk of default, as well as knowledge of the other TSR outputs, may be used by card issuers to improve performance and profitability across the entire business cycle.

Online retail and mail order companies can use the TSR model in both the acquisition and retention phases of the business cycle. During the acquisition phase, for example, the companies can base targeted marketing strategies on TSR outputs. Use in the acquisition phase may substantially reduce costs, especially in the mail order industry, where catalogs are typically sent to a wide variety of individuals. During the retention phase, companies can, for example, base cross-sell strategies or credit line extensions on TSR outputs.

Types of companies which also may make use of the TSR model include, for example: the gaming industry, communications providers, and the travel industry.

The gaming industry can use the TSR model in, for example, the acquisition and retention phases of the business cycle. Casinos often extend credit to their wealthiest and/or most active players, also known as "high rollers." The casinos can use the TSR model in the acquisition phase to determine whether credit should be extended to an individual. Once credit has been extended, the casinos can use the TSR model to periodically review the consumer's risk of default. If there is a change in the spend capacity, the casinos may alter the consumer's credit line to be more commensurate with the consumer's risk of default.

Communications providers, such as telephone service providers, often contract into service plans with their consumers. In addition to improving their targeted marketing strategies, communications providers can use the TSR outputs during the acquisition phase to determine the risk of default on a service contract associated with a potential consumer.

Members of the travel industry can make use of the TSR outputs in the acquisition and retention stages of the business cycle. For example, a hotelier typically has a brand of hotel that is associated with a particular "star-level" or class of hotel. In order to capture various market segments, hoteliers may be associated with several hotel brands that are of different classes. During the acquisition phase of the business cycle, a hotelier may use the TSR outputs to target individuals that have appropriate spend capacities for various classes of hotels. During the retention phase, the hotelier may use the TSR outputs to determine, for example, when a particular individual's risk of default decreases. Based on that determination, the hotelier can market a higher class of hotel to the consumer in an attempt to convince the consumer to upgrade.

One of skill in the relevant art(s) will recognize that many of the above described TSR applications may be utilized by other industries and market segments without departing from the spirit and scope of the present invention. For example, the strategy of using TSR to model an industry's "best consumer" and targeting individuals sharing characteristics of that best consumer can be applied to nearly all industries.

TSR data can also be used across nearly all industries to improve consumer loyalty by reducing the number of payment reminders sent to responsible accounts. Responsible accounts are those that are most likely to pay even without being contacted by a collector. The reduction in reminders may increase consumer loyalty, because the consumer will not feel that the lender or service provider is unduly aggressive. The lender's or service provider's collection costs are also reduced, and resources are freed to dedicate to accounts requiring more persuasion.

Additionally, the TSR model may be used in any company having a large consumer service call center to identify specific types of consumers. Transcripts are typically made for any call from a consumer to a call center. These transcripts may be scanned for specific keywords or topics, and combined with the TSR model to determine the consumer's characteristics. For example, a bank having a large consumer service center may scan service calls for discussions involving bankruptcy. The bank may then use the TSR model with the indications from the call center transcripts to evaluate the consumer.

The risk model may provide information to supplement a promotional campaign. Campaign statistics enable a merchant to view information regarding any number of active and/or inactive offers for loan products. Such information may include, for example, campaign type, current status, number of impressions, a number of clicks resulting from the impressions, yield rate, average cost per yield, total cost, and the like. Campaign statistics provide the merchant with a powerful tool that may lead to, for example, canceling or modifying a campaign if it is not profitable. The campaign statistics interface further allows the merchant to pause and resume offer campaigns, edit campaigns, and delete campaigns.

The present invention contemplates uses in association with web services, utility computing, pervasive and individualized computing, security and identity solutions, autonomic computing, commodity computing, mobility and wireless solutions, open source, biometrics, grid computing and/or mesh computing.

A user may include any individual, business, entity, government organization, software and/or hardware that requests a risk assessment of a consumer. The user may interact with the system directly and may view customized search results. A web client comprises any hardware and/or software suitably configured to facilitate input, receipt and/or review of information relating to merchants that are selected based on a search term entered into a search engine such as, for example, Google™, Yahoo™, MSN™, AOL™, and/or any other Internet-wide or web site centric search engines. A web client includes any device (e.g., personal computer) which communicates (in any manner discussed herein) via any network discussed herein. Such browser applications comprise Internet browsing software installed within a computing unit or system to conduct online transactions and/or communications. These computing units or systems may take the form of a computer or set of computers, although other types of computing units or systems may be used, including laptops, notebooks, hand held computers, personal digital assistants, set-top boxes, workstations, computer-servers, main frame computers, mini-computers, PC servers, pervasive computers, network sets of computers, and/or the like. Practitioners will appreciate that a web client may or may not be in direct contact with an application server. For example, a web client may access the services of an application server through another server, which may have a direct or indirect connection to an Internet server.

As those skilled in the art will appreciate, a web client includes an operating system (e.g., Windows NT, 95/98/2000, OS2, UNIX, Linux, Solaris, MacOS, etc.) as well as various conventional support software and drivers typically associated with computers. A web client may include any suitable personal computer, network computer, workstation, mini-computer, mainframe or the like. A web client can be in a home or business environment with access to a network. In an exemplary embodiment, access is through a network or the Internet through a commercially available web-browser software package.

A web client may be independently, separately or collectively suitably coupled to the network via data links which includes, for example, a connection to an Internet Service Provider (ISP) over the local loop as is typically used in connection with standard modem communication, cable modem, Dish networks, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network.

A web client may include any number of applications, code modules, cookies, and the like to facilitate the permissive search functionality as disclosed herein. In one embodiment, a web client includes a permissive search plug-in that is downloaded from an Internet server prior to performing a search. A permissive search plug-in may include any hardware and/or software suitably configured to detect when text is entered into a search box within a search interface and to submit the entered search text the application server for processing. In one embodiment, a permissive search plug-in retrieves and stores information relating to a user within a memory structure of a web client in the form of a browser cookie, for example. In another embodiment, permissive search plug-in retrieves information relating to user from an application server.

A firewall, as used herein, may comprise any hardware and/or software suitably configured to protect application server components from users of other networks. A firewall may reside in varying configurations including stateful inspection, proxy based and packet filtering among others. A Firewall may be integrated as software within an Internet server, any other application server components or may reside within another computing device or may take the form of a standalone hardware component.

An Internet server may include any hardware and/or software suitably configured to facilitate communications between a web client and one or more application server components. Further, an Internet server may be configured to transmit data to a web client within markup language documents. As used herein, "data" may include encompassing information such as commands, queries, files, data for storage, and/or the like in digital or any other form. An Internet server may operate as a single entity in a single geographic location or as separate computing components located together or in separate geographic locations.

An Internet server may provide a suitable web site or other Internet-based graphical user interface which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, InterBase, etc., may be used to provide an Active Data Object (ADO) compliant database management system.

Any of the communications, inputs, storage, databases or displays discussed herein may be facilitated through a web site having web pages. The term "web page" as it is used herein is not meant to limit the type of documents and applications that might be used to interact with the user. For example, a typical web site might include, in addition to standard HTML documents, various forms, Java applets, JavaScript, active server pages (ASP), common gateway interface scripts (CGI), extensible markup language (XML), dynamic HTML, cascading style sheets (CSS), helper applications, plug-ins, and/or the like. A server may include a web service that receives a request from a web server, the request including a URL (http://yahoo.com/stockquotes/ge) and an IP address (123.56.789). The web server retrieves the appropriate web pages and sends the data or applications for the web pages to the IP address. Web services are applications that are capable of interacting with other applications over a communications means, such as the Internet. Web services are typically based on standards or protocols such as XML, SOAP, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external issuer systems for any of the purposes disclosed herein.

A user database may include any hardware and/or software suitably configured to facilitate storing identification, authentication credentials, user permissions, and user preferences. An Ad database stores data relating to merchants and merchant incentive programs. One skilled in the art will appreciate that the system may employ any number of databases in any number of configurations. Further, any databases discussed herein may be any type of database, such as relational, hierarchical, graphical, object-oriented, and/or other database configurations. Common database products that may be used to implement the databases include DB2 by IBM (White Plains, N.Y.), various database products available from Oracle Corporation (Redwood Shores, Calif.), Microsoft Access or Microsoft SQL Server by Microsoft Corporation (Redmond, Wash.), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors.

In one exemplary embodiment, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the system by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments of system, the data can be stored without regard to a common format. However, in one exemplary embodiment of the invention, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a stand-alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand-alone device, the appropriate option for the action to be taken. The present invention contemplates a data storage arrangement wherein the header or trailer, or header or trailer history, of the data is stored on the transaction instrument in relation to the appropriate data.

One skilled in the art will also appreciate that, for security reasons, any databases, systems, devices, servers or other components of the present invention may consist of any combination thereof at a single location or at multiple locations, wherein each database or system includes any of various suitable security features, such as firewalls, access codes, encryption, decryption, compression, decompression, and/or the like.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the present invention. As those skilled in the art will appreciate, user computer may include an operating system (e.g., Windows NT, 95/98/2000, OS2, UNIX, Linux, Solaris, MacOS, etc.) as well as various conventional support software and drivers typically associated with computers. The computer may include any suitable personal computer, network computer, workstation, minicomputer, mainframe or the like. User computer can be in a home or business environment with access to a network. In an exemplary embodiment, access is through a network or the Internet through a commercially-available web-browser software package.

As used herein, the term "network" (or similar terms) shall include any electronic communications means which incorporates both hardware and software components of such. Communication among the parties in accordance with the present invention may be accomplished through any suitable communication channels, such as, for example, a telephone network, an extranet, an intranet, Internet, point of interaction device (point of sale device, personal digital assistant, cellular phone, kiosk, etc.), online communications, satellite communications, off-line communications, wireless communications, transponder communications, local area network (LAN), wide area network (WAN), networked or linked devices, keyboard, mouse and/or any suitable communication or data input modality. Moreover, although the invention is frequently described herein as being implemented with TCP/IP communications protocols, the invention may also be implemented using IPX, Appletalk, IP-6, NetBIOS, OSI or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, Dilip Naik, Internet Standards And Protocols (1998); Java 2 Complete, various authors, (Sybex 1999); Deborah Ray And Eric Ray, Mastering Html 4.0 (1997); And Loshin, Tcp/Ip Clearly Explained (1997) and David Gourley and Brian Totty, Http, The Definitive Guide (2002), the contents of which are hereby incorporated by reference.

The invention may be described herein in terms of functional block components, screen shots, optional selections and various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and/or the like, which may carry out a variety of functions under the control of one or more microprocessors or other control devices. Similarly, the software elements of system may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted that the present invention may employ any number of conventional techniques for data transmission, signaling, data processing, network control, and/or the like. Still further, a system may be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schreier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As will be appreciated by one of ordinary skill in the art, the system may be embodied as a customization of an existing system, an add-on product, upgraded software, a stand alone system, a distributed system, a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

These software elements may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, web pages, web sites, web forms, prompts, etc. Practitioners will appreciate that the illustrated steps described herein may comprise in any number of configurations including the use of windows, web pages, web forms, popup windows, prompts and/or the like. It should be further appreciated that the multiple steps as illustrated and described may be combined into single web pages and/or windows but have been expanded for the sake of simplicity. In other cases, steps illustrated and described as single process steps may be separated into multiple web pages and/or windows but have been combined for simplicity.

Practitioners will appreciate that there are a number of methods for displaying data within a browser-based document. Data may be represented as standard text or within a fixed list, scrollable list, drop-down list, editable text field, fixed text field, pop-up window, and/or the like. Likewise, there are a number of methods available for modifying data in a web page such as, for example, free text entry using a keyboard, selection of menu items, check boxes, option boxes, While the steps outlined above represent a specific embodiment of the invention, practitioners will appreciate that there are any number of computing algorithms and user interfaces that may be applied to create similar results. The steps are presented for the sake of explanation only and are not intended to limit the scope of the invention in any way.

Benefits, other advantages, and solutions to problems have been described herein with regard to specific embodiments. However, the benefits, advantages, solutions to problems, and any element(s) that may cause any benefit, advantage, or solution to occur or become more pronounced are not to be construed as critical, required, or essential features or elements of any or all the claims or the invention. It should be understood that the detailed description and specific examples, indicating exemplary embodiments of the invention, are given for purposes of illustration only and not as limitations. Many changes and modifications within the scope of the instant invention may be made without departing from the spirit thereof, and the invention includes all such modifications. Corresponding structures, materials, acts, and equivalents of all elements in the claims below are intended to include any structure, material, or acts for performing the functions in combination with other claim elements as specifically claimed. The scope of the invention should be determined by the appended claims and their legal equivalents, rather than by the examples given above. Reference to an element in the singular is not intended to mean "one and only one" unless explicitly so stated, but rather "one or more." Moreover, where a phrase similar to 'at least one of A, B, and C' is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the invention has been described as a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

We claim:

1. A method comprising:
   modeling, by a risk analysis computer, consumer spending patterns of a consumer using credit data associated with said consumer to obtain an estimated spend capacity of said consumer;
   calculating, by said risk analysis computer, a comprehensive consumer default risk value for said consumer based upon said credit data consumer transactional data comprising at least one of transaction amount, transaction time, transaction vendor/merchant, and transaction vendor/merchant location, and said estimated spend capacity, wherein said comprehensive consumer default risk value represents a risk associated with said consumer defaulting on an existing debt obligation; and
   wherein said calculating comprises selecting, by said risk analysis computer, an appropriate risk factor relationship based upon said consumer credit data and said internal data.

2. The method of claim 1, further comprising determining a strategy to interact with said consumer based on said comprehensive consumer default risk value for said consumer.

3. The method of claim 2, wherein said determining a strategy further comprises making credit approval decisions for said consumer based upon said comprehensive consumer default risk value.

4. The method of claim 2, wherein said determining a strategy further comprises soliciting said consumer for additional products in accordance with said comprehensive consumer default risk value.

5. The method of claim 2, wherein said determining a strategy further comprises discontinuing a relationship with said consumer based upon said comprehensive consumer default risk value.

6. The method of claim 1, further comprising establishing a new transaction account based upon said comprehensive consumer default risk value.

7. The method of claim 1, further comprising establishing a new mortgage based upon said comprehensive consumer default risk value.

8. The method of claim 1, further comprising establishing a new automobile loan based upon said comprehensive consumer default risk value.

9. The method of claim 1, further comprising establishing a new student loan based upon said comprehensive consumer default risk value.

10. The method of claim 1, further comprising modeling, by said risk analysis computer, said consumer spending patterns of said consumer using said credit data associated with said consumer to obtain said estimated spend capacity of said consumer.

11. The method of claim 10, wherein said modeling consumer spending patterns further comprises:
    receiving credit bureau data comprising a plurality of accounts of said consumer over a previous period of time;
    identifying any balance transfers into at least one of said plurality of accounts based upon said credit bureau data;
    discounting any spending identified for any of said plurality of accounts for any portion of said previous period of time in which a balance transfer to such account is identified; and
    estimating a purchasing ability of said consumer based on said credit bureau data and said discounting.

12. The method of claim 11, further comprising establishing a new transaction account based upon said comprehensive consumer default risk value.

13. The method of claim 11, further comprising establishing a new mortgage based upon said comprehensive consumer default risk value.

14. The method of claim 11, further comprising establishing at least one of a new automobile loan and a new student loan based upon said comprehensive consumer default risk value.

15. The method of claim 10, wherein said modeling consumer spending patterns further comprises:
    identifying at least two categories wherein a first category includes consumers that primarily pay down credit account balances and a second category including consumers that primarily revolve credit account balances; and
    assigning said consumer to at least one of said categories.

16. The method of claim 10, further comprising determining a strategy to interact with said consumer based on said comprehensive consumer default risk value for said consumer.

17. The method of claim 16, wherein said determining a strategy further comprises at least one of making credit approval decisions for said consumer based upon said comprehensive consumer default risk value, and soliciting said consumer for products in accordance with said comprehensive consumer default risk value.

18. A system comprising:
    a non-transitory memory communicating with a risk analysis processor;
    said non-transitory memory having instructions stored thereon that, in response to execution by said processor, cause said processor to perform operations comprising:
    modeling, by said risk analysis processor, consumer spending patterns of a consumer using credit data associated with said consumer to obtain an estimated spend capacity of said consumer;
    calculating, by said risk analysis processor, a comprehensive consumer default risk value for said consumer based upon said credit data, consumer transactional data comprising at least one of transaction amount, transaction time, transaction vendor/merchant, and transaction vendor/merchant location, and said estimated spend capacity, wherein said comprehensive consumer default risk value represents a risk associated with said consumer defaulting on an existing debt obligation; and
    wherein said calculating comprises selecting, by said risk analysis processor, an appropriate risk factor relationship based upon said consumer credit data and said internal data.

19. An article of manufacture including a non-transitory computer readable medium having instructions stored thereon that, in response to execution by a risk analysis computing device, cause said computing device to perform operations comprising:
    modeling, by said risk analysis computing device, consumer spending patterns of a consumer using credit data associated with said consumer to obtain an estimated spend capacity of said consumer;
    calculating, by said risk analysis computing device, a comprehensive consumer default risk value for said consumer based upon said credit data, consumer transactional data comprising at least one of transaction amount, transaction time, transaction vendor/merchant, and transaction vendor/merchant location, and said estimated spend capacity, wherein said comprehensive consumer default risk value represents a risk associated with said consumer defaulting on an existing debt obligation; and wherein said calculating comprises selecting, by said risk analysis computing device, an appropriate risk factor relationship based upon said consumer credit data and said internal data.

* * * * *

UNITED STATES PATENT AND TRADEMARK OFFICE
CERTIFICATE OF CORRECTION

PATENT NO.         : 8,554,666 B2                           Page 1 of 1
APPLICATION NO.    : 13/165701
DATED              : October 8, 2013
INVENTOR(S)        : Tirthankar Choudhuri et al.

It is certified that error appears in the above-identified patent and that said Letters Patent is hereby corrected as shown below:

On the Title page, item (75) Inventors, please delete "Dewan Anjali" and insert therefor
--Anjali Dewan--.

Signed and Sealed this
Third Day of December, 2013

Margaret A. Focarino
*Commissioner for Patents of the United States Patent and Trademark Office*